United States Patent
Abraham et al.

(10) Patent No.: US 9,070,138 B2
(45) Date of Patent: Jun. 30, 2015

(54) DETERMINING EFFECTIVENESS OF ADVERTISING CAMPAIGNS

(75) Inventors: Magid M. Abraham, Great Falls, VA (US); Michael A. Brown, Ashburn, VA (US); Steven Chase, Leesburg, VA (US); Chad Maccarelli, Reston, VA (US); Walter Ramdeholl, Brampton (CA)

(73) Assignee: comScore, Inc., Reston, VA (US)

( * ) Notice: Subject to any disclaimer, the term of this patent is extended or adjusted under 35 U.S.C. 154(b) by 1256 days.

(21) Appl. No.: 12/363,378

(22) Filed: Jan. 30, 2009

(65) Prior Publication Data

US 2009/0204476 A1  Aug. 13, 2009

Related U.S. Application Data

(60) Provisional application No. 61/025,236, filed on Jan. 31, 2008.

(51) Int. Cl.
*G06Q 30/00* (2012.01)
*G06F 15/16* (2006.01)
*G06Q 30/02* (2012.01)

(52) U.S. Cl.
CPC ............ *G06Q 30/0212* (2013.01); *G06Q 30/02* (2013.01); *G06Q 30/0224* (2013.01); *G06Q 30/0225* (2013.01); *G06Q 30/0242* (2013.01)

(58) Field of Classification Search
CPC ................................. G06Q 30/02; G06F 15/16
USPC ............................ 705/14, 10, 14.41; 709/203
See application file for complete search history.

(56) References Cited

U.S. PATENT DOCUMENTS

| | | | |
|---|---|---|---|
| 7,050,989 B1 * | 5/2006 | Hurt et al. | 705/14.51 |
| 2003/0191653 A1 | 10/2003 | Birnbaum et al. | |
| 2004/0024632 A1 | 2/2004 | Perry | |
| 2007/0038516 A1 | 2/2007 | Apple et al. | |
| 2007/0156532 A1 * | 7/2007 | Nyhan et al. | 705/14 |
| 2008/0086524 A1 * | 4/2008 | Afergan et al. | 709/202 |

OTHER PUBLICATIONS

International Search Report and Written Opinion for corresponding International Application No. PCT/US09/32712, mailed Mar. 6, 2009.
PCT Notification Concerning Transmittal of International Preliminary Report on Patentability for International Application No. PCT/US2009/032712 mailed Mar. 6, 2009 (6 pages).
U.S. Appl. No. 12/698,454, filed Feb. 2, 2010, 27 pages.
European Office Action for Application No. 09706005.7-2221 dated May 4, 2011, 5 pages.
Official Journal EPO, Notice from the European Patent Office dated Oct. 1, 2007 concerning business methods, pp. 592-593, XP007905525.

* cited by examiner

*Primary Examiner* — Sun Li
(74) *Attorney, Agent, or Firm* — Andrew Bodendorf

(57) ABSTRACT

An identifier associated with a client machine is accessed, and parameters that define a control group of client machines for a particular advertising campaign are accessed. The advertising campaign is associated with one or more standard advertisements. Whether the client machine is a member of the control group based on the identifier associated with the client machine and the parameters that define the control group is determined. If the determination of whether the client machine is a member of the control group indicates that the client machine is a member of the control group, a control advertisement is caused to be presented on the client machine. The control advertisement is an advertisement not associated with the advertising campaign.

33 Claims, 3 Drawing Sheets

DETERMINING EFFECTIVENESS OF ADVERTISING CAMPAIGNS

CROSS-REFERENCE TO RELATED APPLICATION

This application claims the benefit of U.S. Provisional Application No. 61/025,236, filed Jan. 31, 2008 and titled DETERMINING EFFECTIVENESS OF ADVERTISING CAMPAIGNS, which is incorporated herein by reference in its entirety.

BACKGROUND

In general, advertisers may want to maintain a control group of users that have not been exposed to an advertisement included in an advertising campaign. Having a control group may allow the advertiser, or a third party, to assess the effectiveness of the advertising campaign.

SUMMARY

In one general aspect, an identifier associated with a client machine is accessed, and parameters that define a control group of client machines for a particular advertising campaign are accessed. The advertising campaign is associated with one or more standard advertisements. Whether the client machine is a member of the control group is determined based on the identifier associated with the client machine and the parameters that define the control group. If the determination of whether the client machine is a member of the control group indicates that the client machine is a member of the control group, a control advertisement is caused to be presented on the client machine. The control advertisement is an advertisement not associated with the advertising campaign. If the determination of whether the client machine is a member of the control group indicates the client machine is not a member of the control group, one or more of the standard advertisements are caused to be presented on the client machine.

Implementations may include one or more of the following features. Whether the client machine is a potential member of the control group may be determined based on the identifier associated with the client machine, and the client machine may be added to the control group when it is determined that adding the client machine to the control group satisfies the parameters that define the control group. The parameters that define the control group may include an amount of users to include in the control group. The identifier associated with the client machine may be an identifier associated with a browser executing on the client machine. The identifier of the browser may be a user agent designation of the browser and the identifier associated with the client machine also may include a network address associated with the client machine. The identifier associated with the client machine may be a hash of the user agent designation and the network address. The identifier associated with the client machine may be derived from one or more of a user agent designation or a network address associated with the client machine. The network address may be an Internet Protocol (IP) address. The network address may be a MAC address. The network address may be one or more IP addresses associated with the client machine.

A webpage may be received in response to a request sent from a browser executing on the client machine, the webpage including a reference to an object, and accessing the identifier associated with the client machine may include executing the object to determine an identifier associated with the client machine or the browser. Determining whether the client machine is a member of a control group based on the identifier associated with the client machine and the parameters that define the control group may include receiving the identifier associated with the client machine in a request sent from the client machine and received by a remote server, and analyzing the received identifier by a process running on the remote server.

In some implementations, a survey may be presented on the client machine. The survey may be a survey configured to elicit information related to effectiveness of the advertising campaign. The survey may be a survey configured to elicit information related to the one or more standard advertisements. Presenting the survey on the client machine may include displaying the survey after presenting the control advertisement or one or more of the standard advertisements on the client machine.

In another general implementation, a webpage is received in response to a request sent from a browser executing on a client system, a webpage, the webpage includes a reference to an object. The object is executed to determine an identifier of the browser and to determine, based on predefined rules applied to the identifier, whether the client system is a potential member of a control group. Based on a determination that the client computer is a potential member, a request is sent to a server, the request including an internet protocol address and a user agent designation of the browser. A response is received from the server, the response including an advertisement, where the advertisement includes a control advertisement if the client computer is a member of the control group and the advertisement includes a standard advertisement otherwise. The received advertisement is displayed.

Implementations may include one or more of the following features. The object may be an applet. The object may be an application. The object may be a script. The request may be a hypertext transfer protocol request. The identifier may be a hash of the user agent designation of the browser.

Implementations of any of the techniques described above may include a method or process, an apparatus, a machine, a system, or instructions stored on a computer-readable storage device. The details of particular implementations are set forth in the accompanying drawings and description below. Other features will be apparent from the following description, including the drawings, and the claims.

DETAILED DESCRIPTION

The effectiveness of an advertisement included in an advertising campaign may be determined by displaying a control advertisement to a control group of webpage visitors who have not yet viewed the advertisement and inviting the users in the control group to complete a survey regarding the advertisement as well as potentially providing a survey to users that have been exposed to the advertisement. The control group of visitors may be assembled based on the target number of users expected to be exposed to the advertisement. An application, such as a shockwave application, may be provided to an advertising server participating in the advertising campaign, downloaded to a webpage visitor's computer along with a webpage requested by the visitor, and used to determine whether the visitor should be included in the control group. Such an application may be used instead of, or in addition to, cookies to determine whether a user is, or should be, in the control group.

Figure 1A:
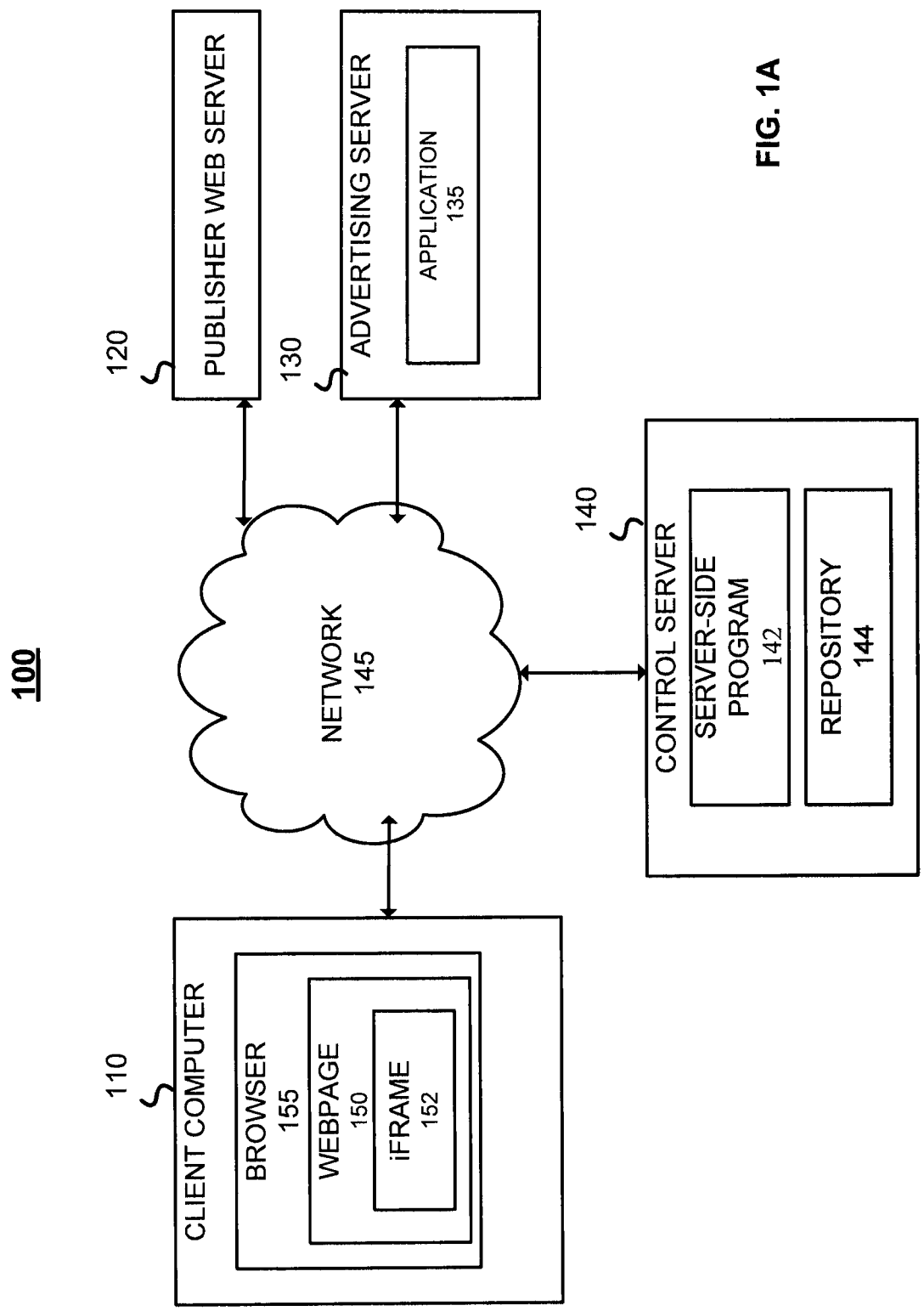
FIG. 1A shows an example block diagram of a system for maintaining a control group.

Referring to FIG. 1A, a system 100 includes a client computer 110, a publisher web server 120, an advertising server 130, and a control server 140 that communicate and exchange data through a network 145. In particular, the system 100 may be used to provide advertisements to users and to determine whether a user of the client computer 110 is, or should be, included in a control group. The control group may include users who have not previously viewed a particular advertisement. The members of the control group may be exposed to a control advertisement (which is not the advertisement included in the advertising campaign) and some or all of the members may be given the opportunity to participate in a survey regarding the advertisement. The control advertisement may be stored on the advertising server 130. The survey may be provided concurrently with, or shortly after, the display of the advertisement. Users that are not in the control group are exposed to the standard advertisement that is part of the advertising campaign. Some of those users also may be given a survey. To maintain the control group, an application is downloaded with a requested webpage to a user's computer and determines whether to include the user in the control group.

Figure 1B:
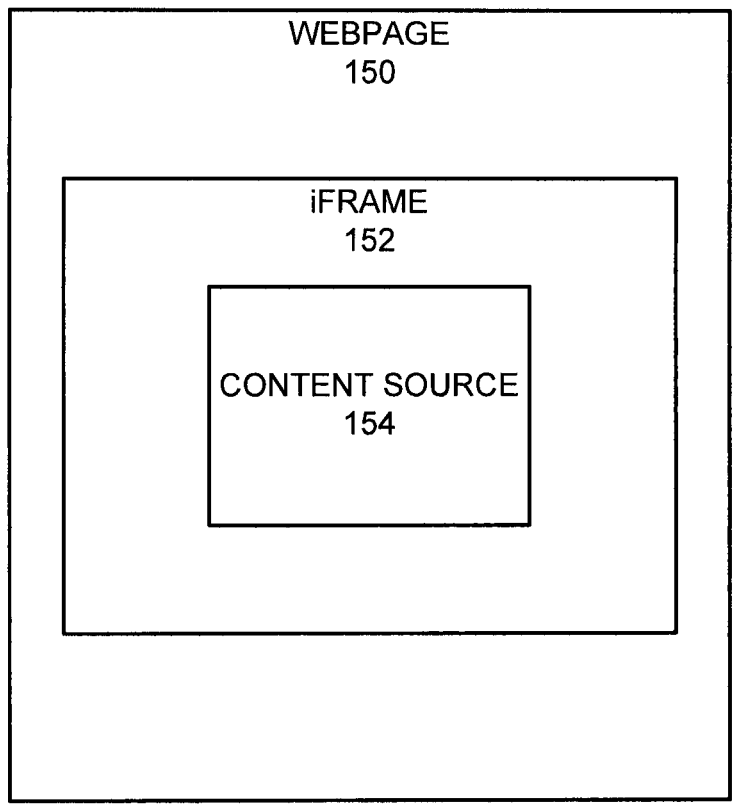
FIG. 1B shows an example block diagram of a webpage.

Specifically, the client computer 110 requests a webpage 150 from the publisher web server 120. The publisher web server 120 serves the webpage 150 for rendering in a browser 155 on the client computer 110. Referring briefly to FIG. 1B, an illustration of the webpage 150 is shown. The webpage 150 includes an iFrame 152, which may be located in a portion 153 of the webpage 150 reserved for displaying an advertisement. The iFrame 152 acts as a container, or placeholder, for content and the iFrame 152 includes a reference (e.g, a uniform resource locator (URL)), or a pointer, to a content source 154. The content source 154 may be, for example, the advertising server 130. Through the reference to the content source 154, the iFrame 152 obtains content for display within the iFrame 152 from the content source 154.

Returning to FIG. 1A, the advertising server 130 includes an application 135, which may be the content referenced by the iFrame 152. The application 135 may be, for example, a shockwave application, a Java script, or a Java applet. The application 135 may be compiled with a URL associated with an advertisement that is included in the advertising campaign. This advertisement may be referred to as the standard advertisement. The application 135 also may be compiled with an identifier of the advertising campaign. In some implementations, the URL associated with the advertisement and the identifier of the advertising campaign are passed to the application 135 rather than being compiled with the application 135. The iFrame 252 references the application 135 such that the application 135 is downloaded to the client computer 110 along with the webpage 150, and the application 135 is executed on the client computer 110.

Figure 2:
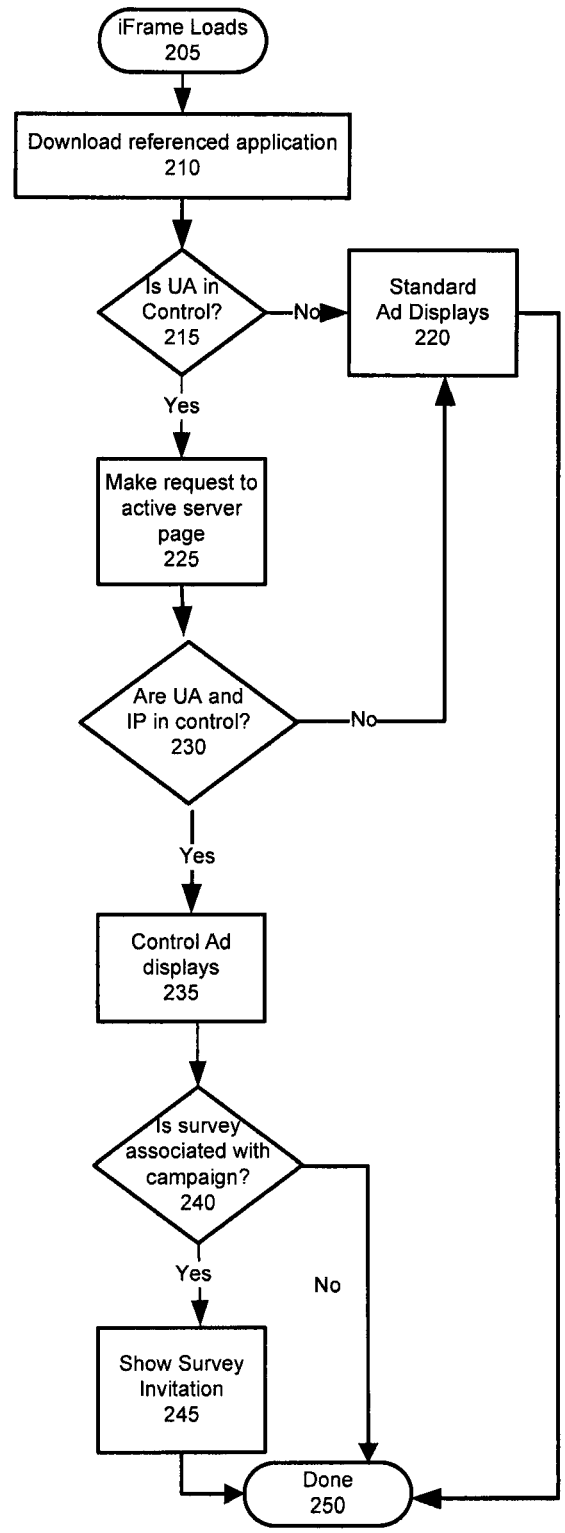
FIG. 2 shows an example process for determining a control group of webpage visitors.

As discussed in more detail with respect to FIG. 2, the application 135 determines whether the user of the client computer 110 is a candidate for inclusion in the control group. There may be a desired amount of users to be included in the control group. The desired amount of users may be, for example, expressed as a percentage of the total number of users expected to be exposed to the standard advertisement. The desired amount of users may be expressed as a number of users. Users in the control group include users that have not seen the standard advertisement associated with the URL that is compiled with, or passed to, the application 135. If the user is not a member or potential member of the control group, the application 135 retrieves the standard advertisement from the advertising server 130 and displays the standard advertisement in the iFrame 152. If the user is a potential member of the control group, the application 135, instead of showing the standard advertisement to the user, makes a request to a server-side program 142 on the control server 140.

The control server 140 includes the server-side program 142 and a repository 144. The server side program 142 may be implemented using, for example, CGI, Java Servlets, ASP, or any other active scripting language. In some implementations, the server-side program 142 may be a Java Server Page (JSP). The server-side program 142 further analyzes information about the user to determine whether the user is, or should be, included in the control group. Users who are included in the control group are shown an alternate, or control, advertisement rather than the standard advertisement. The alternate advertisement may be stored on the control server 140. In some implementations, the alternate advertisement may be stored on the advertising server 130. The repository 144 stores information about users included in the control group such that subsequent requests from the users included in the control group result in the users in the control group seeing the control advertisement. The repository 144 also may include surveys associated with particular campaign identifiers.

The repository 144 may be implemented on any type of machine-readable medium capable of storing data, including instructions that cause a processing device to perform operations. The repository 144 may be, for example, a relational database that logically organizes data into a series of database tables. The data stored in the repository 144 may, for example, include data identifying the client computer 110, data identifying one or more users of the client computer 110, data identifying the type of browser 155 on the client computer 110, an identifier of the standard advertisement, one or more alternate advertisements, and IP addresses obtained from requests made by the client computer 110. The repository 144 may be, for example, an object-oriented database that logically or physically organizes data into a series of objects. Each object may be associated with a series of attribute values. The repository 144 also may be a type of database management system that is not necessarily a relational or object-oriented database. For example, a series of XML files or documents may be used, where each XML file or document includes attributes and attribute values. Although the repository 144 is shown in FIG. 1A as being integrated with the control server 140, this is not necessarily the case in other implementations. For example, the repository 144 may be located on a central server that exchanges data with the control server 140.

Referring to FIG. 2, an example process 200 is shown. The example process 200 may be used to maintain a control group and determine the effectiveness of an advertising campaign. The process 200 may be performed by a processor included on a client computer, such as the client computer 110 discussed above with respect to FIG. 1A. Portions of the process 200 also may be performed by a processor included on a server that is separate from the client computer. For example, portions of the process 200 may be performed by a processor included in the control server 140 discussed above with respect to FIG. 1A.

An inline frame ("iFrame") loads (205). The iFrame may be similar to the iFrame 152 discussed above with respect to FIG. 1A. The iFrame is loaded within a webpage, such as the webpage 150 discussed above with respect to FIG. 1, that is rendered on a user's computer in response to a request made by the user for a webpage located at a publisher web server. The webpage requested by the user is rendered by a browser application running on the user's computer, and the rendered webpage includes the iFrame. An iFrame is a HyperText Markup Language (HTML) element that may embed another HTML document inside a main HTML document. The iFrame may include a reference to a content source, such as an advertising server, and may particularly point to an object, such as an application (e.g., a shockwave application) that is used to help maintain the control group. Such an application or object may be referred to as a referenced application or a referenced object.

The referenced application is downloaded to the user's computer (210). The referenced application is rendered in the iFrame included in the rendered webpage, and the referenced application is executed on the user's computer. The referenced application may be a shockwave application, and the shockwave application may be compiled with the URL of a standard advertisement and an identifier corresponding to an advertising campaign. In some implementations, the URL of the standard advertisement and/or the identifier of an advertising campaign may be passed to the shockwave application. The identifier of the advertising campaign may be referred to as a "campaign ID," and the identifier may identify a particular advertising campaign. Instead of retrieving the standard advertisement for display in the portion of the webpage that includes the iFrame, the referenced application is executed on the user's computer and renders content in the portion of the webpage that includes iFrame. As discussed below, the content rendered by execution of the referenced application may be the standard advertisement or may be a control advertisement.

Whether the user is a potential member of the control group is determined (215). There may be a desired amount of users to be included in the control group. The desired amount of users may, for example, be expressed as a percentage of the total number of users expected to be exposed to the standard advertisement. In some implementations, the desired amount of users may be expressed as a number of users. In some implementations, to determine whether the user is a potential member of the control group, the referenced application obtains a User Agent (UA) through Java script, or some other method, executing on the user's machine, and the referenced application determines a unique identifier corresponding to the UA. The unique identifier may be a hash, such as an MD5 hash, of the UA. Whether the user is a potential member of the control group may be determined by analyzing the unique identifier corresponding to the UA. The analysis of the UA may be based on one or more predefined rules. For example, the unique identifier may be a character string that includes numbers, symbols, and/or letters. Each of the characters included in the unique identifier may be determined based on a known distribution of characters available for inclusion in the unique identifier. For example, the first character of the unique identifier may be a number between "0" and "9," with the occurrence of any number between "0" and "9" being equally likely. In one example, the desired amount of users to include in the control group may be 20% of expected viewers of an advertisement and the first character of the unique identifier of the UA is a number between "0" and "9." To select 20% of expected viewers of an advertisement, users associated with unique identifiers that have a "0" or a "1" as the first character are selected as potential control group members.

If the user is not a potential member of the control group, the referenced application displays the standard advertisement in the iFrame (220). If the user is a potential member of the control group, the referenced application makes a request to a server-side program on a control server (225). Logic included in the server-side program further analyzes the information about potential members of the control group. The server-side program may follow, for example, the aspx file format. The control server may be a server such as the control server 140 discussed above with respect to FIG. 1A. The request to the server-side program from the referenced application to the server-side program passes the campaign identifier associated with the advertisement to the control server and includes the IP address and user agent of the client computer.

The user agent and internet protocol address of the client computer are used to determine whether the user is, or should be, in the control group (230). The aspx page determines whether the user is in the control group by creating a hash of the client computer IP address and the user agent. Together, the user agent and the IP address represent a unique viewing of the advertisement during an online session. The user agent and IP address may be used to eliminate multiple views of the same advertisement by a particular user. Additionally, if the user is in the control group, the hash of the client computer IP address and the user agent associated with the user is stored in a repository to record that the user was in the control group. Subsequent requests by the user will result in display of the control advertisement because the information in the repository indicates that the user has already been placed in the control group. The repository retains the hash for the remainder of the lifetime of the advertising campaign. Thus, if a user has already been included in the control group, the user remains in the control group.

A segmentation scheme is applied to the hash of the client computer IP address and the user agent to determine whether the user is in the control group. The segmentation scheme may include predefined rules to determine whether the user should be in the control group. For example, the predefined rule may specify that 10% of the users are eligible to be in the control group, and the unique identifier based on the client computer IP address and the user agent may include a number between "0" and "9" as the first character of the unique identifier. To select 10% of the users, all unique identifiers beginning with "0" may be selected as members of the control group. In some implementations, a user may be excluded from the control group because the user is on a list of users to whom surveys are not shown (e.g., a blacklist) or because the user is running a spider process.

If the user is not in the control group, the standard advertisement is returned to the application and the application shows the standard advertisement to the user (220). If the user is in the control group, an alternate advertisement is returned and shown (235). The alternate advertisement also may be referred to as a control advertisement.

If the user is in the control group, the repository is accessed to determine whether a survey is associated with the campaign ID associated with the advertisement (240). If there is not a survey associated with the advertisement, the process 200 terminates (250). If there is a survey associated with the advertisement, whether a survey quota has been satisfied is determined. For example, the survey quota may be satisfied when a threshold number of users has completed the survey or a predetermined percentage of users has completed the survey. If the survey quota has not been satisfied, a response is sent from the repository to the referenced application including the survey and indicating that the survey is to be shown with the advertisement.

The survey may be displayed adjacent to the advertisement (e.g., the survey may appear below the advertisement, on either side of the advertisement, or on the advertisement). The survey may be displayed after the advertisement is displayed in order to allow the user to focus attention on the advertisement and form an opinion prior to completing the survey. For example, the display of the survey may occur 4-5 seconds after the display of the advertisement. In this manner, the user views the advertisement without interference with the appearance of the survey. In some implementations, if the quota has not been satisfied, an invitation to participate in the survey is shown (245). In some implementations, the survey is shown only if the invitation is accepted by the user, although in other implementations, the survey is shown with the advertisement regardless of whether the invitation is displayed and/or selected. The user may be given the option to dismiss the survey rather than complete the survey in some implementations. Similarly, a survey may be provided to users that receive the standard advertisement.

The techniques can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the techniques have been described. Nevertheless, it will be understood that various modifications may be made. For example, useful results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. An article of manufacture comprising:
one or more non-transitory computer-readable storage mediums coupled to one or more computers and storing instructions which, when executed by the one or more computers, cause the one or more computers to perform operations comprising:
providing a downloadable application for a client machine, the downloadable application configured to cause the client machine to:
obtain information about the client machine;
establish a unique identifier for the client machine corresponding to the obtained information about the client machine;
determine whether the client machine is a potential member of a control group of client machines by analyzing at least a portion of the unique identifier, wherein the control group is presented a control advertisement that is not included in a particular advertising campaign;
present one or more standard advertisements associated with the particular advertising campaign when the client machine determines that the client machine is not a potential member of the control group; and
generate a request from the client machine indicating that the client machine has been determined to be a potential member of the control group when the client machine determines that the client machine is a potential member of the control group;
receiving the request from the client machine generated by executing the downloadable application indicating that the client machine has been determined to be a potential member of the control group of client machines;
accessing parameters that define the control group of client machines;
determining an identifier for the client machine in response to the request;
determining whether the client machine is a member of the control group based on the identifier associated with the client machine and the parameters that define the control group;
causing presentation of the control advertisement not associated with the advertising campaign on the client machine when it is determined that the client machine is a member of the control group; and
causing presentation of one or more of the standard advertisements associated with the particular advertising campaign on the client machine when it is determined that the client machine is not a member of the control group.

2. The article of claim 1, wherein determining the identifier associated with the client machine includes determining a hash of an identifier of a browser executing on the client machine and a network address associated with the client machine and the one or more mediums further store instructions which, when executed, cause the one or more computers to perform operations comprising:
adding the client machine to the control group by storing the hash when the control server determines that the client machine is a member of the control group.

3. The article of claim 1, wherein the parameters that define the control group comprise an amount of users to include in the control group.

4. The article of claim 1, wherein the identifier associated with the client machine comprises an identifier associated with a browser executing on the client machine.

5. The article of claim 4, wherein the identifier of the browser is a user agent designation of the browser and the identifier associated with the client machine further includes a network address associated with the client machine.

6. The article of claim 5, wherein the network address comprises an Internet Protocol (IP) address.

7. The article of claim 4, wherein the identifier associated with the client machine is derived from one or more of a user agent designation or a network address associated with the client machine.

8. The article of claim 1, wherein the identifier associated with the client machine is a hash of a user agent designation of the browser of the client machine and the network address of the client machine.

9. The article of claim 1, wherein the identifier associated with the client machine is derived from an object referenced by a web page requested by a browser executing on the client machine and the object is executed by the client machine to determine an identifier associated with the client machine or the browser executing on the client machine.

10. The article of claim 1, wherein the one or more mediums further store instructions which, when executed, cause the one or more computers to perform operations comprising causing presentation of a survey on the client machine.

11. The article of claim 10, wherein the survey is a survey configured to elicit information related to effectiveness of the advertising campaign.

12. The article of claim 11, wherein the survey is a survey configured to elicit information related to the one or more standard advertisements.

13. The article of claim 11, wherein the survey is configured to present after presenting the control advertisement or one or more of the standard advertisements on the client machine.

14. The article of claim 1 wherein providing the downloadable application for a client machine further comprises providing the downloadable application configured to cause the client machine to determine whether the client machine is a potential member of the control group of client machines by analyzing the unique identifier based on one or more predefined rules that define a potential member of the control group.

15. The article of claim 14 wherein establishing the unique identifier includes determining a hash of an identifier of a browser executing on the client machine.

16. The article of claim 14 wherein the one or more predefined rules include an amount of users to include in the control group.

17. The article of claim 1, wherein the one or more mediums further store instructions which, when executed, cause the one or more computers to perform operations comprising causing presentation of a survey on the client machine when the client machine is determined to be in the control group.

18. A method of controlling a client machine by a control server, the method comprising:
providing a downloadable application for a client machine, the downloadable application configured to cause the client machine to:
obtain information about the client machine;
establish a unique identifier for the client machine corresponding to the obtained information about the client machine;
determine whether the client machine is a potential member of a control group of client machines by analyzing at least a portion of the unique identifier, wherein the control group is presented a control advertisement that is not included in a particular advertising campaign;
present one or more standard advertisements associated with the particular advertising campaign when the client machine determines that the client machine is not a potential member of the control group; and
generate a request from the client machine indicating that the client machine has been determined to be a potential member of the control group when the client machine determines that the client machine is a potential member of the control group;
receiving, by the control server, the request from the client machine generated by the downloadable application indicating that the client machine has been determined to be a potential member of a control group of client machines;
accessing, by the control server, parameters that define the control group of client machines;
determining by the control server an identifier associated with the client machine in response to the request;
determining by the control server whether the client machine is a member of the control group based on the identifier associated with the client machine and the parameters that define the control group;
causing presentation of the control advertisement not associated with the advertising campaign on the client machine when the control server determines that the client machine is a member of the control group; and
causing presentation of one or more of the standard advertisements associated with the particular advertising campaign on the client machine when the control server determines that the client machine is not a member of the control group.

19. The method of claim 18, wherein
determining the identifier associated with the client machine includes determining a hash of an identifier of a browser executing on the client machine and a network address associated with the client machine, the method further comprising:
adding the client machine to the control group by storing the hash when the control server determines that the client machine is a member of the control group.

20. The method of claim 18, wherein the parameters that define the control group comprise an amount of users to include in the control group.

21. The method of claim 18, wherein the identifier associated with the client machine comprises an identifier associated with a browser executing on the client machine.

22. The method of claim 21, wherein the identifier of the browser is a user agent designation of the browser and the identifier associated with the client machine further includes a network address associated with the client machine.

23. The method of claim 22, wherein the identifier associated with the client machine is derived from one or more of a user agent designation or a network address associated with the client machine.

24. The method of claim 18, wherein the identifier associated with the client machine is a hash of a user agent designation of the browser of the client machine and the network address of the client machine.

25. The method of claim 18, wherein determining the identifier associated with the client machine further comprises deriving the identifier associated with an object referenced by a web page requested by a browser executing on the client machine and the object is executed by the client machine to determine an identifier associated with the client machine or the browser executing on the client machine.

26. The method of claim 18, further comprising causing presentation of a survey on the client machine.

27. The method of claim 26, wherein the survey is a survey configured to elicit information related to effectiveness of the advertising campaign.

28. The method of claim 18 wherein providing a downloadable application for the client machine further comprises providing the downloadable application configured to cause the client machine to determine whether the client machine is a potential member of the control group of client machines by analyzing the unique identifier based on one or more predefined rules that define a potential member of the control group.

29. The method of claim 28 wherein establishing the unique identifier includes determining a hash of an identifier of a browser executing on the client machine.

30. The method of claim 28 wherein the one or more predefined rules include an amount of users to include in the control group.

31. The method of claim 18 causing presentation of a survey on the client machine when the client machine is determined to be in the control group.

32. A control system comprising:
a client machine configured to download and execute an application, the application configured to cause the client machine to:
obtain information about the client machine;
establish a unique identifier for the client machine corresponding to the obtained information about the client machine;
determine whether the client machine is a potential member of a control group of client machines by analyzing at least a portion of the unique identifier, wherein the control group is presented a control advertisement that is not included in a particular advertising campaign;
present one or more of the standard advertisements associated with the particular advertising campaign on the client machine when the client machine determines that the client machine is not a potential member of the control group; and
generate a request from the client machine indicating that the client machine has been determined to be a potential member of the control group when the client machine determines that the client machine is a potential member of the control group; and
a control server configured to:
receive the request generated by the client machine executing the application indicating that the client machine has been determined to be a potential member of the control group;
access parameters that define the control group of client machines;
determine an identifier for the client machine in response to the request;
determine whether the client machine is a member of the control group based on the unique identifier associated with the client machine and the parameters that define the control group;
cause presentation of the control advertisement not associated with the advertising campaign on the client machine when the control server determines that the client machine is a member of the control group; and
cause presentation of one or more of the standard advertisements associated with the particular advertising campaign on the client machine when the control server determines that the client machine is not a member of the control group.

33. An article of manufacture comprising:
one or more non-transitory computer-readable storage mediums coupled to one or more processing devices of a client machine and storing downloaded instructions which, when executed by the one or more processing devices of the client machine, cause the one or more processing device to perform operations comprising:
obtaining information about the client machine;
establishing a unique identifier for the client machine corresponding to the obtained information about the client machine;
determining whether the client machine is a potential member of a control group of client machines by analyzing at least a portion of the unique identifier, wherein the control group is presented a control advertisement that is not included in a particular advertising campaign;
presenting one or more standard advertisements associated with the particular advertising campaign when it is determined that the client machine is not a potential member of the control group; and
generating a request from the client machine to a control server indicating that the client machine has been determined to be a potential member of the control group when the client machine determines that the client machine is a potential member of the control group;
receiving either an indication the control advertisement that is not included in the particular advertising campaign or one or more standard advertisements associated with the particular advertising campaign in response to the request; and
presenting either the received control advertisement or the received one or more standard advertisements on the client machine.

* * * * *